Figures 1, 2, 3, 4:
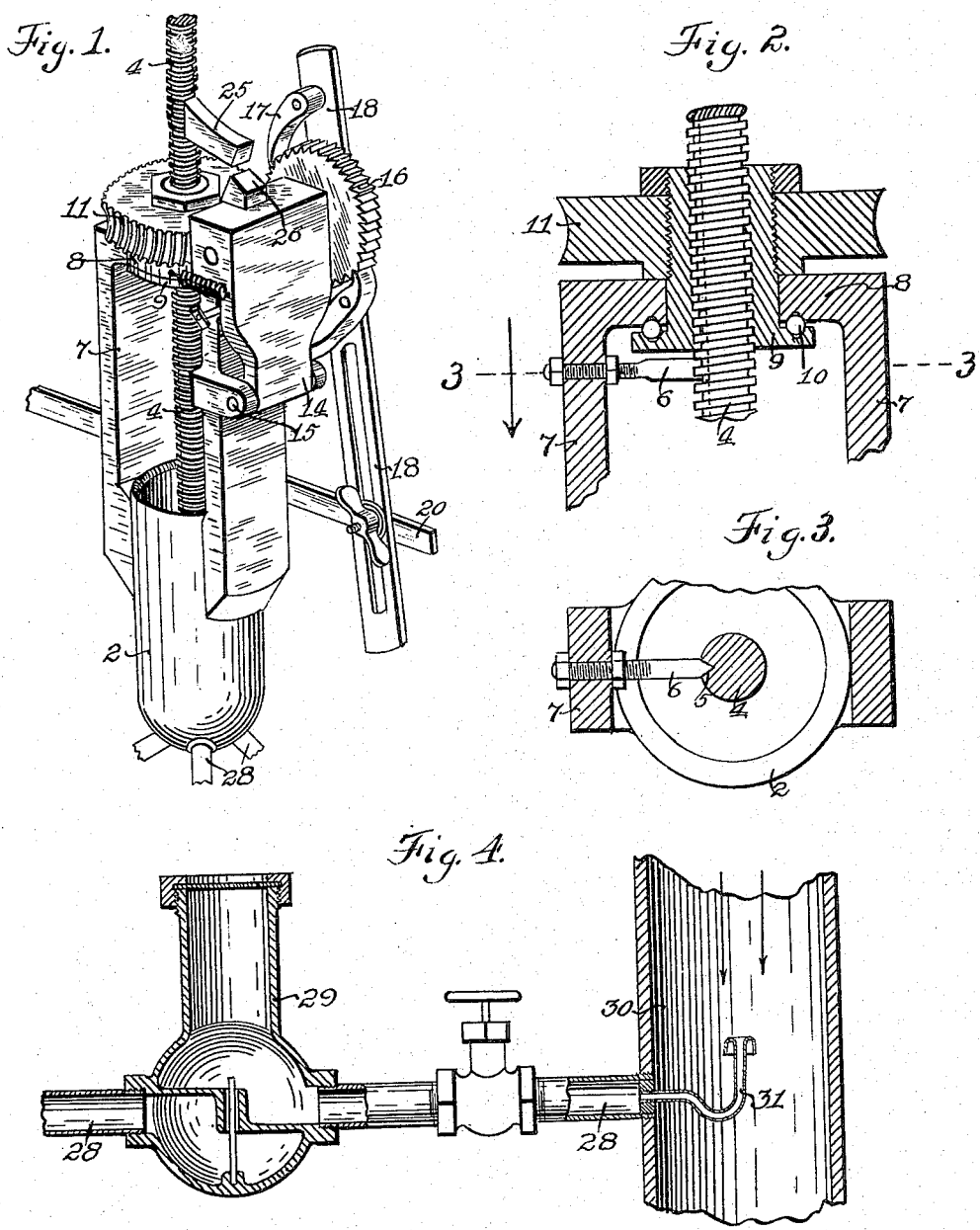

S. M. JENKINS.
LUBRICATING APPARATUS.
APPLICATION FILED APR. 27, 1912.

1,163,410.

Patented Dec. 7, 1915.

WITNESSES:
Harry W. Davis.
A. H. Attridge

INVENTOR.
Samuel M. Jenkins.

S. M. JENKINS.
LUBRICATING APPARATUS.
APPLICATION FILED APR. 27, 1912.
1,163,410.
Patented Dec. 7, 1915.
2 SHEETS—SHEET 2.
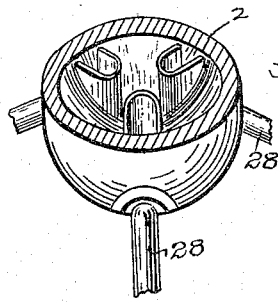
Fig. 5.
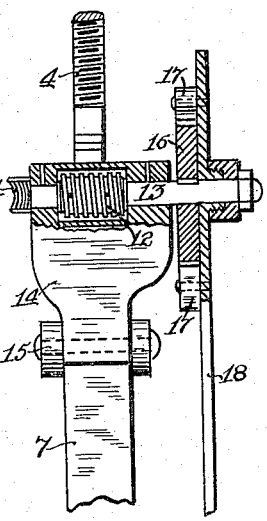
Fig. 6.
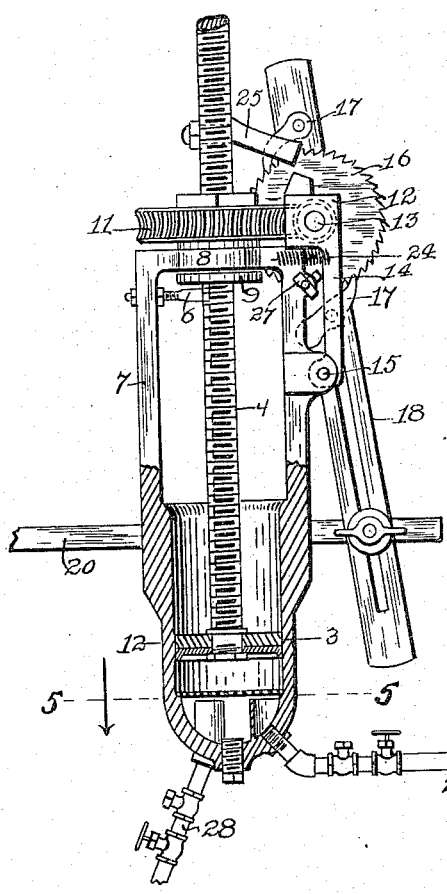
Fig. 7.
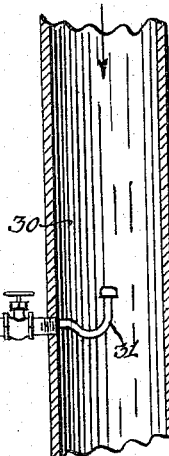
WITNESSES:
Harry W. Davis
A. F. Attridge
INVENTOR.
Samuel M. Jenkins.

UNITED STATES PATENT OFFICE.

SAMUEL M. JENKINS, OF LOUISVILLE, KENTUCKY.

LUBRICATING APPARATUS.

1,163,410.  Specification of Letters Patent.  Patented Dec. 7, 1915.

Application filed April 27, 1912. Serial No. 693,745.

*To all whom it may concern:*

Be it known that I, SAMUEL M. JENKINS, a resident of Louisville, Jefferson county, Kentucky, have invented a new and useful Improvement in Lubricating Apparatus, of which the following is a full, clear, and exact description, reference being had to the accompanying drawings, forming part of this specification, in which—
Figure 1 is a perspective view showing one form of my improved apparatus; Fig. 2 is a partial vertical section showing the rotary bearing and stem; Fig. 3 is a cross-section showing the pin for preventing rotation of the stem; Fig. 4 is a sectional side elevation showing the steam pipe and heating and exit pipe portion of the lubricating apparatus; Fig. 5 is a sectional perspective of the lower portion of cylinder; Fig. 6 is a sectional detail view of the worm gear feeding device; and Fig. 7 is a sectional elevation of the assembled device.

My invention relates to the lubricating of engines and prime movers, and is designed particularly to provide for the carrying of finely powdered graphite to the working surfaces; although it may be used with heavy greases without the use of graphite.

In carrying out my invention I provide a pressure device in which the heavy grease is placed and is forced out in a column through a conduit or pipe. At the end of this column is a heating pipe within which the grease is liquefied and then atomized and fed into a current of fluid in small particles.

The invention is especially adapted for feeding lubricating material into the steam pipe or motive fluid inlet pipe for prime movers.

In the drawing, 2 represents an open-ended cylinder with a spherical bottom, and 3 the piston therein, which preferably has a suitable cup leather. This piston is secured to the lower end of a threaded stem 4, which stem has a spline groove 5 within which an adjustable pin 6 projects to prevent rotation. This pin is secured to a U-shaped frame 7 fastened to the sides of the cylinder. In the upper cross bar portion 8 of the frame is mounted a rotary bearing 9, preferably having bearing balls 10 between it and the frame to take up thrust. On this rotary bearing is secured a worm wheel 11, which is engaged by a worm 12 on shaft 13, mounted in bearings on a swinging frame 14 pivotally carried on a lower pin 15 secured to the frame. This swinging frame carries the shaft 13, on which is mounted a ratchet wheel 16 having actuating pawls 17 pivotally mounted on a ratchet lever 18. This ratchet lever is slotted to adjustably receive a pivotal connection with an actuating link 20, which is connected to any suitable reciprocating part of the engine or valve mechanism.

A spring 24 normally holds the worm in engagement with the worm wheel, and these parts are disengaged automatically at the end of the feed stroke of the piston by a tappet 25 secured to the upper end of the threaded stem and engaging a cam projection 26 at the top of the swinging frame. These parts may also be disengaged by a thumb latch 27 on the frame 7, which is weighted to fall into disengaging position and lock the worm apart from the worm wheel after the tappet 25 has forced it back.

In filling the cup with a new charge, the worm is disengaged from the worm wheel by the thumb latch and the piston is turned up by hand by rotating the worm wheel in the opposite direction. The charge of grease is then inserted, the piston lowered upon it, the worm engaged with the worm wheel, the thumb latch thrown into off position, and the grease is forced forward by a series of pulsations received through the ratchet mechanism, ratchet drive and screw.

From the bottom of the cylinder leads one or more feed pipes or conduits 28. In the intermediate part of these, I may employ a sight feed device, as shown at 29 in Fig. 4, though this may or may not be used, as desired. The end of the feed pipe 28 is preferably secured in the side of the steam supply pipe 30, and to its inner end is secured the heating and exit tube 31, which is preferably of U-shape and is bent so as to open against the direction of the stream of steam, as indicated by the arrows.

In the use of the apparatus, the link 20 being actuated from any reciprocating part of the engine, will give a series of pulsating pressures to the viscous or solid grease in the cup and force the column forward into the heating and exit tube. As the grease enters its tube it becomes heated and liquefied, and will exude from its open end and become atomized and carried forward by the stream of highly heated steam. The grease and graphite carried thereby will thus be deposited upon the working surfaces of the valves and motor and give highly efficient lubrication thereto.

The advantages of my invention result from the improved apparatus, by which heavy grease may be fed in finely divided atomized charges to the working parts of a motor with or without graphite suspended therein as desired. I preferably employ the graphite, however, as it is a highly efficient lubricant for such purposes. The grease which I ordinarily employ is a mixture of cylinder stock or valve oil, graphite and paraffin. These are mixed up in liquid form, and then allowed to cool, giving a viscous or solid cake. The mixture which I prefer to employ is set forth in my copending application No. 693,746, filed April 27th, 1912.

The advantages of my invention will be appreciated by those skilled in the art, since means is provided for supplying finely divided graphite to the working parts of a motor.

By reason of the open-end form of the cylinder 2, and the facility with which the pressure devices may be removed therefrom, the apparatus can be very quickly recharged. On a locomotive, for instance, the cup or cylinder can be re-charged with grease while running at top speed.

Many changes may be made in the form and arrangement of the cup, the means for applying pressure thereto, &c., without departing from my invention.

The novel method of lubricating prime movers by means of graphite forms the subject matter of my copending application Serial No. 709,101, filed July 17, 1912.

I claim:—

1. An apparatus for lubricating steam engines with heavy grease, comprising a container for the grease, a pipe leading from the container to the steam pipe for the engine, a tube of smaller diameter connected to the pipe leading from the container and extending into the steam pipe, said tube being bent in a reverse curve and having its outlet end parallel with the steam pipe and extending toward the steam inlet, and mechanism for feeding the grease from the container through the pipe and tube; substantially as described.

2. An apparatus for lubricating steam engines with heavy grease, comprising a container for the grease, a pipe leading from the container to the steam pipe for the engine, a plunger within said container for feeding the grease, a stem connected to said plunger, a worm wheel having a screw threaded connection with the stem of said plunger, a worm journaled in a swinging frame for driving the worm wheel, resilient means for retaining the worm in connection with the worm wheel, means for actuating the worm wheel, and a throw-out device connected to the plunger stem arranged to engage the worm frame to disconnect the worm and worm wheel when the plunger has been moved down a predetermined distance, substantially as described.

S. M. JENKINS.

Witnesses:
A. P. ATTRIDGE,
JNO. F. KRAUSGILL.

Copies of this patent may be obtained for five cents each, by addressing the "Commissioner of Patents, Washington, D. C."